United States Patent
Stefan et al.

(10) Patent No.: US 9,457,689 B2
(45) Date of Patent: Oct. 4, 2016

(54) METHOD AND APPARATUS FOR NOTIFICATION THAT A LIVING ENTITY REMAINS IN A VEHICLE

(71) Applicant: Ford Global Technologies, LLC, Dearborn, MI (US)

(72) Inventors: Frederic Stefan, Aachen (DE); Uwe Gussen, Huertgenwald (DE); Christoph Arndt, Rheinland-Pfalz (DE); Frank Petri, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/491,235

(22) Filed: Sep. 19, 2014

(65) Prior Publication Data
US 2015/0084759 A1    Mar. 26, 2015

(30) Foreign Application Priority Data
Sep. 20, 2013   (DE) .......................... 10 2013 218 962

(51) Int. Cl.
*B60Q 1/00*     (2006.01)
*B60N 2/00*     (2006.01)
*B60N 2/26*     (2006.01)
*G08B 21/22*    (2006.01)

(52) U.S. Cl.
CPC ................ *B60N 2/002* (2013.01); *B60N 2/26* (2013.01); *G08B 21/22* (2013.01)

(58) Field of Classification Search
CPC ...... B60N 2/002; B60N 2/26; B60N 2/2806; B60Q 9/00; G08B 21/22; B08B 21/24; B08B 21/02; B08B 21/18; B08B 25/016; B08B 25/10; B08B 21/0247

USPC .................. 340/457, 438, 439, 573.1, 425.5, 340/426.12, 426.24, 539.11, 666, 539.21, 340/539.23; 701/1, 45
See application file for complete search history.

(56) References Cited

U.S. PATENT DOCUMENTS

| | | | |
|---|---|---|---|
| 7,170,401 B1 * | 1/2007 | Cole | B60N 2/002 340/439 |
| 8,970,362 B2 * | 3/2015 | Morley | B60N 2/002 340/438 |

(Continued)

FOREIGN PATENT DOCUMENTS

| | | |
|---|---|---|
| DE | 102006053618 A1 | 5/2008 |
| DE | 102009036488 A1 | 2/2011 |

OTHER PUBLICATIONS

German Patent and Trademark Office, Examination Report for the corresponding German Patent Application No. 10 2013 218 962.1 mailed Feb. 7, 2014.

*Primary Examiner* — Anh V La
(74) *Attorney, Agent, or Firm* — Jennifer Stec; Brooks Kushman P.C.

(57) ABSTRACT

A system and method for notifying a driver who is leaving a stationary motor vehicle that there is still a person or an animal in the motor vehicle is presented. Exemplary notification modes include a notification mode in which the notification of the driver also depends on whether the current time falls in preset times; a notification mode in which the notification also depends on whether the motor vehicle is located within preset geographical areas; and a notification mode in which the notification also depends on whether preset or learned patterns of driver behavior have been detected.

15 Claims, 1 Drawing Sheet

(56) References Cited

U.S. PATENT DOCUMENTS

| | | | |
|---|---|---|---|
| 2002/0161501 A1* | 10/2002 | Dulin | B06B 1/0215 701/45 |
| 2008/0001730 A1* | 1/2008 | Barton | B60N 2/002 340/457 |
| 2009/0027188 A1 | 1/2009 | Saban | |
| 2012/0154136 A1* | 6/2012 | Connelly, Jr. | B60Q 9/00 340/457 |
| 2012/0330479 A1* | 12/2012 | Oshiro | G06Q 50/30 701/1 |
| 2013/0049955 A1 | 2/2013 | Hoover et al. | |
| 2013/0070043 A1 | 3/2013 | Geva et al. | |

* cited by examiner

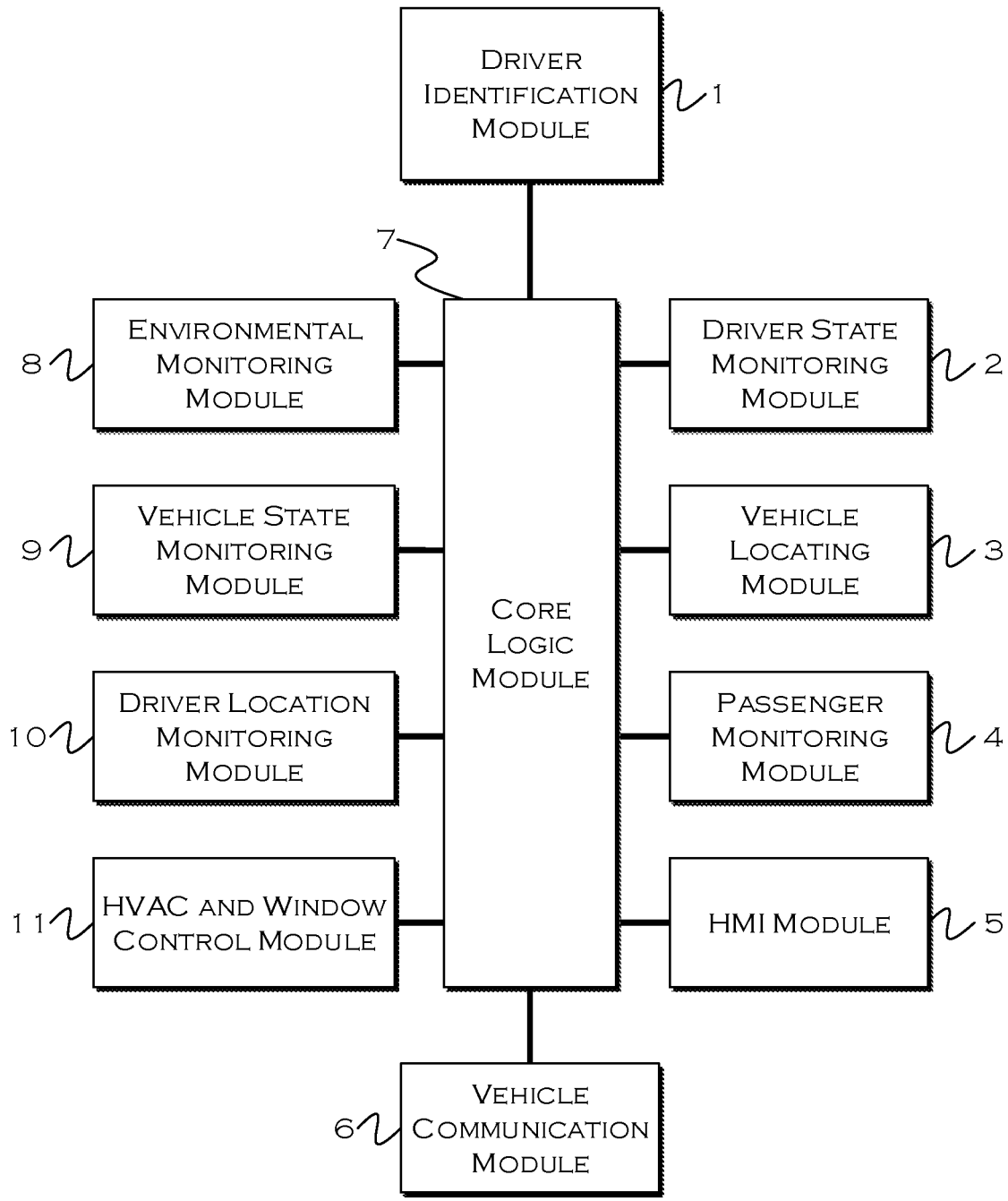

METHOD AND APPARATUS FOR NOTIFICATION THAT A LIVING ENTITY REMAINS IN A VEHICLE

CROSS-REFERENCE TO RELATED APPLICATIONS

This application claims foreign priority benefits under 35 U.S.C. §119(a)-(d) to DE 10 2013 218 962.1 filed Sep. 20, 2013, which is hereby incorporated by reference in its entirety

TECHNICAL FIELD

The invention relates to methods and apparatus for providing notification that a person or an animal (also referred to as "living being" for short in the following text) remains in a stationary motor vehicle.

BACKGROUND

The invention relates to methods and apparatus for providing notification that a person or an animal (also referred to as "living being" for short in the following text) remains in a stationary motor vehicle.

If a driver only briefly locks and leaves the motor vehicle in which there is still a child, for example in order to refuel and to pay, and the driver will normally be back almost immediately, it is not problematic to leave a child or animal in the vehicle. In this case, a notification, particularly when it is an alarm, may not only be disturbing to the driver, but also desensitizes the driver over time to important warnings. This can result in the driver ignoring said warnings in an actual emergency, or neglecting to lock the doors so that no alarm is given.

SUMMARY

In a first illustrative embodiment, the driver receives an appropriate notification if he leaves or has left the motor vehicle, such as an alarm or an alert message, after a certain time and/or if the temperature in the vehicle interior exceeds a certain value.

In a second illustrative embodiment, the notification of the driver may also depend on whether or not the current time falls in one or more preset times when the driver leaves or has left the motor vehicle. In this case, the current time may be a time of day, a day of the week and/or a calendar date, and the preset times may be particular times of day, days of the week and/or calendar dates.

In a third illustrative embodiment, the notification of the driver may also depend on whether or not the motor vehicle is located within one or more preset geographical areas when the driver leaves or has left the motor vehicle.

In a fourth illustrative embodiment, the notification of the driver may also depend on whether or not one of a plurality of preset or learnt patterns of driver behavior have been detected.

A driver who puts a system performing the method into operation for the first time can start with a first notification mode and then perform the presettings for customizable notification modes, and/or allow the system to learn patterns of driver behavior for other notification modes.

By way of example and not limitation, if the driver regularly stops with a child in the vehicle at a location at which he absolutely does not want to leave the child behind in the vehicle, said driver can preset the corresponding time and/or the corresponding geographical area, for example, by simply pressing a particular key or a screen button when he stops at the location. If the driver later selects another notification mode, said driver is warned when he leaves the vehicle at this location and/or at this time without taking the child with him.

Conversely, if the driver regularly stops with a child in the vehicle at a location at which he normally wants to temporarily leave the child in the vehicle, said driver could preset the corresponding time and/or the corresponding geographic area, for example simply by pressing another particular button or screen button when he stops at the location. If the driver later selects another notification mode, he may not be (or at any rate may not immediately be) notified when he leaves the vehicle at this location and/or at this time without taking the child with him. He still can be warned if he is away for an unexpectedly long time or if he leaves the vehicle at other times or in locations other than preset locations.

In this way, over time, a number of presettings are assembled, with which presettings alternative notification modes can operate, with the result that the driver can switch over thereto in order to be still warned only about actually critical situations, but not be disturbed unnecessarily.

Alternatively and/or in addition, the system, while it is operating in any of the notification modes, can automatically compile and/or update the at least one pattern of driver behavior on the basis of the stopping locations or the stopping times of the motor vehicle which has been left by the driver over the course of many days or weeks. That is to say that the pattern or patterns of driver behavior are compiled by a learning algorithm.

As soon as the system has learned something about the driver behavior, a predictive mode can be activated, in which, in the case of particular driver behavior corresponding to observed behavior, for example, the driver only receives an appropriate notification if a stopping time which is the maximum expected according to the compiled pattern is exceeded or an expected stopping location is left.

In situations in which the pattern or patterns of driver behavior do not exist for currently observed behavior, for example, in the case of a stopping location which has not yet been sufficiently observed, the driver can be immediately notified as a precaution that there is still a living being in the motor vehicle.

Notification can also be made dependent on whether a driver is away from the motor vehicle for more than a preset time or goes further away from the motor vehicle than a preset distance. Notification can also be made dependent on the current environmental conditions, for example, on weather conditions, the current sun exposure of the motor vehicle, prevailing passer-by density, general population density in the surroundings of the motor vehicle, etc. Corresponding data for determining conditions can be obtained automatically by means of cameras or wireless internet, for example.

The circumstance in which the motor vehicle is stationary and has been left by the driver can be detected on the basis of preset criteria. Said criteria include, for example, that the vehicle drive has been turned off, the vehicle doors have been locked, and the driver is not in the motor vehicle.

In a preferred embodiment, the method according to the invention is combined with a smart key system, such as, for example FORD MOTOR COMPANY's MyKey® system. This is a system which includes automatic restriction or compulsory activation of particular functions of a motor vehicle depending on person-related data which are unambiguously assigned to a personal electronic vehicle key which identifies its holder to the vehicle electronics as a driver authorized to drive the motor vehicle. Said personal vehicle key may be individually programmable, with the result that the motor vehicle may be only operable in a restricted driving mode with said key. Thus, the top speed, the vehicle acceleration volume of the audio system, etc. can be restricted to preset maximum values, or particular vehicle safety systems or driver assistance systems can be permanently activated, for example seatbelt fastening warning, lane maintaining assistant or adaptive cruise control. This system is intended for specific persons to whom the electronic vehicle key is handed out.

In combination with the MyKey® system or with other, similar systems, the activated notification modes and/or the preset times and/or the preset geographic areas and/or the preset criteria can be set based on the presence of a personal electronic vehicle key. The key identifies its holder to the vehicle electronics as a driver authorized to drive said motor vehicle, and the settings relating to that driver can be applied when using the motor vehicle with the use of said vehicle key.

In at least one embodiment, the driver additionally may only receive a notification or an alert message that there is still a living being in the motor vehicle if a driver state monitoring system detects that the driver is in a stress situation.

BRIEF DESCRIPTION OF THE DRAWINGS

FIG. 1 shows an outline of a system for notifying a driver who is leaving a stationary motor vehicle that there is still a living being in the motor vehicle.

DETAILED DESCRIPTION

As required, illustrative embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

All system modules are optional as suits a particular implementation. An illustrative system comprises a driver identification module 1 which makes it possible to determine who is currently driving the motor vehicle and whether special information relating to said person, including information relating to possible accompanying persons, is stored in combination with a smart system—not shown. The system additionally comprises a driver state monitoring module 2, which is able to analyze current levels of stress and distraction of the driver, for example by means of facial expression recognition or eye monitoring in images taken by means of a camera in the vehicle or by means of an ECG driver's seat. Said module can be used to adapt the type and intensity of an alert message which is sent to the driver by means of an HMI module 5 or a vehicle communication module 6.

The system additionally comprises a vehicle locating module 3, which can be used in order to determine an optimum instant to send an alert message to the driver. By way of example, a GPS system or a vehicle navigation system enables the position to be determined.

The system additionally comprises a module 4 for monitoring the presence of passengers in the motor vehicle. The module 4 is responsible for detecting the presence of passengers other than the driver, in particular children, and possible also animals on the rear seats and optionally in the trunk. For this purpose, by way of example, seat occupancy sensors, cameras in the vehicle and the like, can be used.

The system additionally comprises an HMI module 5, which is a human-machine interface and permits direct feedback to the driver or the alerting of the driver, provided the driver is near the vehicle, for example by means of audible or visual signals.

The system additionally comprises a vehicle communication module 6, which enables communication with a communication device of the driver, for instance a small portable computer, a smartphone, or the like, in order to send alert messages to the driver on said communication device. The module 6 could also send an emergency call to an emergency service if the driver ignores all alert messages.

The system additionally comprises a core logic module 7, which is an operation-scheduling and coordination unit for the other modules 1 to 11. The core logic module 7 is responsible for deciding whether the driver should be alerted or not and which type of alert message should be sent or which special measures should be taken.

The system additionally comprises a module 8 for monitoring environmental conditions. The module 8 primarily monitors the internal temperature of the vehicle and the external temperature, for example by means of temperature sensors.

The system additionally comprises a module 9 for monitoring the vehicle state. For example, the motor vehicle can be stationary, the vehicle can be turned off, the doors can be locked, etc.

The system additionally comprises a module 10 for monitoring the driver location with reference to the vehicle location. In a basic version, the module 10 can simply use the time which passes since the driver leaves the motor vehicle. The absence of the driver can be detected by means of driver seat occupancy sensors, a camera in the vehicle, an electronic vehicle key, opening and closing the driver door after switching off the vehicle, or the like. The distance between the driver and the vehicle can be calculated, for example, from position data from a vehicle navigation system and a smartphone of the driver which communicates with the vehicle.

The system additionally comprises a module 11 for controlling windows and/or an air-conditioning system or fan of the vehicle. If the driver ignores an alarm from the system, the module 11 can automatically switch on an air-conditioning system or fan and/or slightly open the window. In order to start up an air-conditioning system, the system possibly has to restart an internal combustion engine in the vehicle.

If the driver leaves the vehicle and there is still a person or an animal in the vehicle, the system continuously determines the likelihood that the driver has actually "forgotten" the living being, on the basis of criteria such as, but not limited to, the following:

The driver goes too far away from the vehicle (and will therefore not return within a certain time)

The driver remains away too long

Distance and absence time of the driver for which an alarm is given can be made dependent on the environmental conditions:

Weather: if the external temperature is very high or very low, the system could immediately alert the driver that there is still a person in the vehicle, before the driver locks the vehicle, because the health of said person is particularly at risk in such cases.

Vehicle location: if the vehicle is parked in a location with a low population density, the system could immediately alert the driver that there is still a person in the vehicle, before the driver locks the vehicle, since it is unlikely that the person would receive external help in the event of an emergency and since the emergency services would require more time in order to get to said location.

If the system detects that the driver has "forgotten" a living being in the vehicle, the driver is appropriately notified or alerted. The type and intensity of the alarm can depend on the abovementioned factors, namely the distance and absence time of the driver, the weather and the vehicle location. Some examples of alert messages with times and distances which have been selected merely by way of example are detailed in the following table:

| Temperature | Distance of the driver from the vehicle | Absence time of the driver | Vehicle location | Type of alarm |
|---|---|---|---|---|
| Medium | >1000 m | >15 min | Town | Send an SMS or a telephone call to the driver |
| Medium | >500 m | >5 min | Country | Send an SMS or a telephone call to the driver |
| Very low | >200 m | >5 min | Anywhere | Possible reactions: trigger a dedicated vehicle alarm driver cannot lock the vehicle HMI module 5 alerts the driver, for example audibly or visibly |
| Very high | >200 m | >5 min | Anywhere | |
| Extremely low or high | Driver is still in vehicle but is about to leave it | | Anywhere | |

In this way, the driver can normally stop for brief periods of time without the alarm being triggered.

If the driver does not react to the alarm, for example by not returning to the vehicle, not undertaking steps to take the person in the vehicle with him, etc., the system can switch on an air-conditioning system or fan and/or open a window by a small amount. The system could also automatically telephone an emergency service, for example via the emergency telephone number 112.

The system can be customized for a smart key system, such as a system for automatic restriction or compulsory activation of particular functions of a motor vehicle on the basis of person-specific data which are unambiguously assigned to a programmable personal electronic vehicle key which identifies its holder to the vehicle electronics as a driver authorized to drive the motor vehicle. Thus, information can be stored on such an electronic vehicle key, said information relating to whether a particular driver at a particular time of day and on particular days is usually driving with a child on board, for example, in order to take the child to school. When the corresponding driver is detected, it can be automatically preset that a reminder is triggered as soon as an intention of the driver to leave the vehicle is detected.

The system may also be configured by the driver. In a first illustrative notification mode, the driver receives an appropriate notification, for example a reminder not to leave anybody behind in the vehicle, every time when said driver is about to leave the motor vehicle and there is still a living being in the motor vehicle. In further notification modes, the system itself decides whether or not the driver must be alerted; more precisely, in a second illustrative notification mode, notification of the driver also depends on whether or not the current time falls in one or more preset times. In a third illustrative notification mode, notification of the driver also depends on whether or not the motor vehicle is located in one or more preset geographical areas. In a fourth illustrative notification mode, notification of the driver also depends on whether or not preset or learned patterns of driver behavior are detected.

If a driver state monitoring module 2 is present in the motor vehicle, the system can also be configured such that the driver is in addition only alerted that there is still a living being in the motor vehicle if said driver is obviously in a stress situation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    determining, by a driver location monitoring module, that a driver has left a vehicle;
    determining, by a passenger monitoring module, that a living entity remains within the vehicle;
    determining, by a driver identification module, driver identification and corresponding stored calendar dates and/or times;
    determining, by a core logic module, that a condition, in which criteria including one of the calendar dates and/or times has been reached, or driver-behavior matching previously observed driver-behavior pattern of stopping locations or stopping times corresponding to leaving the vehicle for more than a predetermined time period, exists; and
    notifying the driver, by a vehicle communication module, that the living entity remains in the vehicle based on the condition determination.

2. The method as claimed in claim 1, wherein determining that the driver has left the vehicle includes determining that the vehicle has been powered down, vehicle doors have been locked and the driver is not present in the vehicle.

3. The method as claimed in claim 1, wherein determining driver identification and corresponding stored calendar dates and/or times is based on detecting presence of a holder-identifying electronic vehicle key, and the condition criteria used as the basis for notification is set based on the detected presence of the holder-identifying electronic vehicle key.

4. The method as claimed in claim 1, further comprising:
    observing driver-behavior, including identifying a stopping location and a stop duration; and
    storing the observed driver-behavior as said previously observed driver-behavior.

5. The method as claimed in claim 1, further comprising:
    delaying notification until a driver time away from vehicle exceeds a predetermined time limit or a driver distance from vehicle exceeds a predetermined distance.

6. The method of claim 1, further comprising:
  determining a current weather condition or localized passerby density, and wherein the notifying is further based on a current weather condition meeting predefined criteria or a localized passerby density being below a predefined threshold.

7. A system comprising:
  a driver monitoring module to determine that a driver has left a vehicle;
  a passenger monitoring module to determine that a living entity remains within the vehicle;
  a driver identification module to determine driver identification and corresponding stored calendar dates and/or times;
  a processor configured to:
    determine that a condition, in which criteria including one of the calendar dates and/or times has been reached, or driver-behavior matching previously observed driver-behavior pattern of stopping locations or stopping times corresponding to leaving the vehicle for more than a predetermined time period, exists; and
    notify the driver that the living entity remains in the vehicle based on the condition determination.

8. The system of claim 7, wherein the driver monitoring module determines that the vehicle has been powered down, vehicle doors have been locked and the driver is not present in the vehicle, as part of the determination that the driver has left the vehicle.

9. The system of claim 7, wherein determining driver identification and corresponding stored calendar dates and/or times is based on detecting presence of a holder-identifying electronic vehicle key, and the condition criteria used as the basis for notification is set based on the detected presence of the holder-identifying electronic vehicle key.

10. The system of claim 7, the processor further configured to:
  observe driver-behavior, including identifying a stopping location and a stop duration; and
  store the observed driver-behavior as said previously observed driver-behavior.

11. The system of claim 7, the processor further configured to:
  delay notification until a time away of the driver from the vehicle exceeds a predetermined time limit or a driver distance from vehicle exceeds a predetermined distance.

12. The system of claim 7, the processor further configured to:
  determine a current weather condition or localized passerby density, and wherein the notification is further based on a current weather condition meeting predefined criteria or a localized passerby density being below a predefined threshold.

13. A non-transitory computer readable storage medium, storing instructions that, when executed by a processor, cause the processor to interact with modules to perform a method comprising:
  determining that a driver has left a vehicle;
  determining that a living entity remains within the vehicle;
  determining driver identification and corresponding stored calendar dates and/or times;
  determining that a condition, in which criteria including one of the calendar dates and/or times has been reached, or driver-behavior matching previously observed driver-behavior pattern of stopping locations or stopping times corresponding to leaving the vehicle for more than a predetermined time period, exists; and
  notifying the driver that the living entity remains in the vehicle based on the condition determination.

14. The storage medium of claim 13, wherein determining that the driver has left the vehicle includes determining that the vehicle has been powered down, vehicle doors have been locked and the driver is not present in the vehicle.

15. The storage medium of claim 13, wherein determining driver identification and corresponding stored calendar dates and/or times is based on detecting presence of a holder-identifying electronic vehicle key, and the condition criteria used as the basis for notification is set based on the detected presence of the holder-identifying electronic vehicle key.

* * * * *